(12) United States Patent
Martin

(10) Patent No.: US 6,697,812 B1
(45) Date of Patent: Feb. 24, 2004

(54) METHOD AND SYSTEM FOR ELIMINATING ERROR WHEN PACKING OR PACKAGING SETS OF SERIALIZED PRODUCTS OR OTHERWISE IDENTIFIABLE PRODUCTS

(76) Inventor: Peter Martin, 413 Meng Cir., Denton, Denton County, TX (US) 76201

( * ) Notice: Subject to any disclaimer, the term of this patent is extended or adjusted under 35 U.S.C. 154(b) by 0 days.

(21) Appl. No.: 09/484,504

(22) Filed: Jan. 18, 2000

(51) Int. Cl.[7] .............................. G06F 17/30; G06F 7/00
(52) U.S. Cl. ..................... 707/100; 700/217; 700/219; 235/375
(58) Field of Search ................... 707/7, 10, 100–102, 707/104.1; 709/200–203, 212–219, 236, 310–317; 370/351–356, 389–394, 411; 700/213–217, 219–230; 705/28, 29; 235/375, 385

(56) References Cited

U.S. PATENT DOCUMENTS

| | | | | |
|---|---|---|---|---|
| 4,926,420 A | * | 5/1990 | Shimizu | 370/471 |
| 5,038,283 A | * | 8/1991 | Caveney | 705/28 |
| 5,097,466 A | * | 3/1992 | Kammerl | 370/474 |
| 5,478,990 A | * | 12/1995 | Montanari et al. | 235/375 |
| 5,483,524 A | * | 1/1996 | Lev et al. | 370/60.1 |
| 5,524,116 A | * | 6/1996 | Kalmanek, Jr. et al. | 714/799 |
| 5,600,565 A | * | 2/1997 | Wagner et al. | 700/219 |
| 5,675,784 A | * | 10/1997 | Maxwell et al. | 707/100 |
| 5,711,980 A | * | 1/1998 | Terry | 426/392 |
| 5,783,810 A | * | 7/1998 | Kelly, Jr. | 235/385 |
| 5,793,030 A | * | 8/1998 | Kelly, Jr. | 235/385 |
| 5,900,610 A | * | 5/1999 | Kelly, Jr. | 235/385 |
| 6,018,719 A | * | 1/2000 | Rogers et al. | 705/24 |
| 6,085,172 A | * | 7/2000 | Junger | 705/28 |
| 6,092,069 A | * | 7/2000 | Johnson et al. | 707/100 |
| 6,115,387 A | * | 9/2000 | Egbert et al. | 370/423 |
| 6,193,160 B1 | * | 2/2001 | Zembitski | 235/472.01 |
| 6,496,806 B1 | * | 12/2002 | Horwitz et al. | 705/28 |
| 2003/0083964 A1 | * | 5/2003 | Horwitz et al. | 705/28 |

FOREIGN PATENT DOCUMENTS

| GB | 2288171 | * | 5/1995 |
|---|---|---|---|
| GB | 2288171 B | * | 5/1995 |

\* cited by examiner

*Primary Examiner*—Maria N. Von Buhr
(74) *Attorney, Agent, or Firm*—James J. Murphy, Esq.; Winstead Sechrest & Minick, P.C.

(57) ABSTRACT

A method of preparing a set of items for future business processes includes the step of grouping the items to be included in the set, each of the items associated with a unique identifier. The unique identifiers are then recorded en masse and communicated to a database. A set identifier is then generated from the recorded identifier and associated with the set of items.

25 Claims, 2 Drawing Sheets

METHOD AND SYSTEM FOR ELIMINATING ERROR WHEN PACKING OR PACKAGING SETS OF SERIALIZED PRODUCTS OR OTHERWISE IDENTIFIABLE PRODUCTS

TECHNICAL FIELD OF THE INVENTION

The present invention relates in general to the tasks of manufacture and distribution of products that require packing or packaging in sets.

These sets are useful as business entities such as "wholesale case", "sales package", "master carton", "pallet", "container", "shipment"—sets where the content is based on the existence of identifiable units as members of known previously defined sets.

In illustration: An order can consist of multiple shipments. A shipment can consist of a number of truckloads. A truckload can consist of a number of pallets. A pallet consists of a number of master cartons. Each master carton contains of a number of sales packages. Each sales package contains a number of products.

BACKGROUND OF THE INVENTION

In manufacturing and distribution, there is a continuing need for accuracy in the creation of these types of sets. The accuracy of business processes downstream from the creation point of the set is dependent upon the accuracy of the set created.

In the distribution of manufactured items, identifying codes, marks, symbols, or serial numbers, hereinafter referred to as 'unit IDs' are important in order to track products and customers. Sets and groupings of unit IDs are used in such core business functions as product version identification; customer identification; invoices, debits, credits, and adjustments, returned materials systems, repair, etc.

A business goal for manufacturers producing serialized products or products that require identities for business purposes is to create groupings of those products that are accurate. This essential accuracy in turn effects the accuracy of business operations and has far reaching business consequences such as on time delivery, the cost of doing business, customer satisfaction, and profitability. Inaccuracy in serialized product sets results in delay of delivery, re-packaging for accuracy, additional costs for labor, returned products and shipments, diminished customer satisfaction, confusion that must be sorted out, and erosion of profits. Accuracy in packing or packaging is important business.

These issues play out in a fairly ordinary and understandable set of circumstances on the shop floor as well as in customer service transactions with customers.

A useful number of items with unit IDs represented by devices that report the unit ID, marks, symbols, or serial numbers are identified as a set. That grouping, for example a "master carton", is recorded in a business system that includes a database. As in the case of its members, for that set there will be an identifying mark, symbol, or a device that will specify identity when it is recorded in the business system. In business practice, this set will then be contained in larger useful sets or recorded groupings such as those mentioned above—pallet, shipment, order, etc.

The accuracy of packing or packaging the base set is of primary importance and it is that need that the present invention addresses.

SUMMARY OF THE INVENTION

According to the first embodiment of the principles of the present invention, a manufactured product is assigned and identified by a unique serial number or identifier. The identity of the item is displayed as the serial number, or encoded and represented by a symbol, on the unit, encoded into a component of the manufactured unit, encoded or stored in a device associted with the unit, or all of the above. All of these representations of the identity of the item can be retrieved or read.

According to the second embodiment of the principles of the present invention, the serialized product is marked with a unique identifier, a 'unit ID', and moves through a manufacturing and materials handling system to the point where it is required to be included in a larger business grouping. Preferably, this identification of a set of items occurs on the way to the point and before the grouping point the serialized items are packaged or packed as shippable units either by human hand or machine. The identity of the unit as a member of a set is recorded in a product database and the data is used for the business purposes stated above. Depending upon the design and methods of the materials handling system employed, the base unit is moved by some combination of transport, shipping, and conveyance to the point where the serialized product set is created. In the process the set is wrapped, labeled, or marked with some label, mark, written or recorded report or device that contains and provides access to the information concerning the identity of a single unit. This is true if the unit is a set of sets or a set of serialized or otherwise identifiable products.

According to the third embodiment of the principles of the present invention, devices are used to read the serialized identity expressed as a label, mark, written or recorded report. Examples of these devices are hand held or fixed mounted laser bar code symbol readers, machine vision cameras, or radio frequency devices. These devices read the information on part of the manufactured unit in the manufactured unit, or stored in a device attached to the manufactured unit. These devices can be one or more "readers" that together deliver the identities of the members of the set.

According to the fourth embodiment of the principles of the present invention the elements described above are configured to provide a business system with data of useful unit IDentities in groupings such as those mentioned above.

According to the fifth embodiment of the principles of the present invention, the unit IDs of the manufactured items, sets of those items, and supersets or groupings, are grouped. This set creation is accomplished by a process within which the identities of the items are ascertained en masse to provide a business system with data of useful unit identities in groupings such as those mentioned above. The reading and collection of the identities of the set members en masse is accomplished by one or more "reading" devices. The device or devices deliver the identities of the set members to the business system. This process may or may not include use of a computer depending upon the functionality of the reading device(s).

According to the sixth embodiment of the principles of the present invention the set size in number of units is controlled by the packaging, wrapping, or form that contains the set. The present invention provides the data which answers the following questions: (1) What is the identity of a manufactured item? (2) What are the identities of the members of a business process set for any level recorded by the business system.

The principles of the present invention are most particularly embodied by methods and systems used in set creation and recording of identifiable units into useful business sets.

In common practice and usage of the present day, useful business groupings created by counting out a number of units, establishing those specific items as a set, and packing or packaging them together with labeling that includes information of set identity. This method is derived from the practical handling of materials on conveyors. Items follow each other one at a time on an assembly line and operations are applied to items in a serial fashion. In this method the set identity is assigned prior to the point the items are grouped in a set.

The present invention is, in summary, a different and novel method of grouping the serialized or otherwise identifiable items into business system sets. Using the invented method, a materials handling system groups the items together in a physical package, wrapping, gig, form, or binding that determines the size in number of the set and then records the unit IDs of the set members en masse. In the case of the gig or form, the packaging is applied at the reading point or immediately thereafter. No set identification is created before the packing or packaging point according to the inventive principles. The recording of the set uses the devices mentioned above to record the identity information of each item and communicate the set membership information as data, picture, or any other useful symbology to the business system. This en masse method is in contrast to the prior art methods and systems that use sequential counting of items to assign members to a set. Moreover, this en masse read method works at every level of grouping and eliminates error in the creation of the groupings.

The practical advantage in the real world of the shop and packing floor of the inventive methods and systems is that within the set of units to be packed or packaged the units may be rearranged prior to being read en masse. For example a quality control person might take a unit off a packaging line for inspection and replace it later without the possibility of introducing inaccuracy. Or if a powered conveyor were to fail and access to the actual reading devices is blocked, then the packaging work that does not interfere with the read operation can continue uninterrupted. Packaged sets of units can be made in any order of units and set aside for future processing by the reading system when it is accessible. Additionally, this method has real world advantages in terms of error handling. When an error in the en masse read of a grouping occurs the grouping can be put aside for error definition and correction procedures and the work at hand continued since failing the set creation it is not a set and the manufactured units can be dispersed at will. Error conditions are discussed in detail below. This flexibility of handling coupled with accuracy is the huge advantage of the invented method and system over a counting based method.

This is in contrast to typical existing counting method where the set assignment occurs prior to the point that the units are actually physically grouped as a set. The members of the set must be maintained as a set in conveyance to the packing point. A quality control monitor cannot walk off with a member of the set after it has been read without either compromising accuracy or halting the packaging process. And the work at hand is not flexible, if the reading (counting) point is inaccessible then the entire work process comes to a halt.

The speed of the inventive en masse identity processing systems and methods also accommodate the serialization of consumer products that heretofore had not been serialized but for which a need for serialization had emerged—for instance cigarette packages or ammunition cartridges. At the packaging point for these small items, an optional marking device, for instance, a high-speed miniature printer or laser etcher, could assign serialized or batch markings to the items and that identity information stored in a product database. Later by reference to the markings and the product information important characteristics of the items can be ascertained. Questions such as origin of the unit; age of the unit; efficiency of the batch; history of the unit or batch; or whether tax; duties; or required fees were paid on the item or batch could be addressed assuming such information had been maintained within a system.

Systems and methods embodying the principles of the present invention provide substantial advantages over the prior art.

BRIEF DESCRIPTION OF THE DRAWINGS

For a more complete understanding of the present invention and references thereof, reference is now made to the following descriptions taken in conjunction with the accompanying drawings, in which.

DETAILED DESCRIPTION OF THE INVENTION

Figure 2:
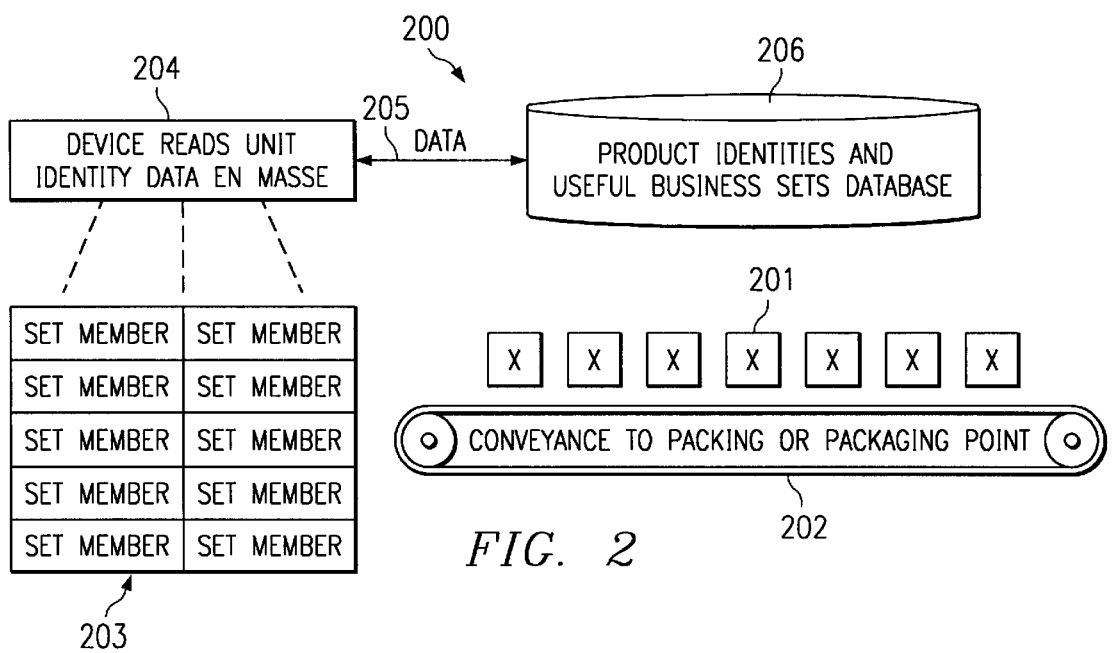
FIG. 2 is a high level, functional block diagram of a method and system embodying the principles of the present invention—the en masse read method and system of business set creation.

The principle of the present invention and their advantages are best understood by referring to the illustrated embodiment depicted in FIG. 2. While the principles of the present invention may be applied to a wide variety of packaging and packing systems, these principles will be described in conjunction with and contrast to set creation typically employed on packing and packaging lines.

Figure 1:
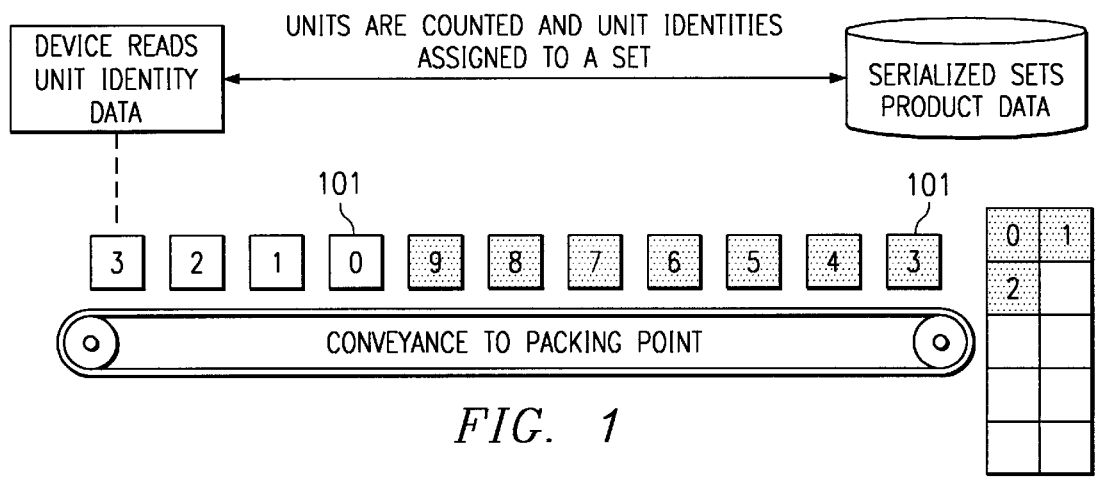
FIG. 1 is a high level, functional block diagram of a counting method of business process set creation to which the present invention is contrasted and compared.

FIG. 1 illustrates the conventional method of packing and packaging serialized products. According to this process, units 101 are counted during conveyance process. The units are counted-out until the number required for a group or set has been reached. The group or set is thereby identified and its members packed or packaged after set creation. Specifically, those members still in conveyance must be joined with those already packaged or packed in order to insure the group (set) is accurate.

FIG. 2 is a high level functional diagram of a portion of a packaging system 200, specifically the functional area where business sets, in this illustration 'master cartons,' of serialized products are created.

FIG. 2 shows a conveyance of manufactured items 201 toward the point at which they are to be grouped, packed, or packaged into a useful business process set or grouping. This may be accomplished for example by a conveyor system 202 or similar automated handling system. During conveyance to the packing or packaging point, the manufactured items do not have a set identity. However, the items may already have been grouped and have a set identity such as a "sales package" or a "master carton", but during conveyance to the packing or packaging point they are self contained and have no group identity pertaining to the next grouping.

As an example, even though a "sales package" has products with unique identities in it and might be a set of items already associated in the database (not a usual practice), there would be no grouping of sales packages defined as a set during conveyance to the packing or packaging point where those sales packages would be grouped together and identified as a "master carton". However, as the items approach the packing or packaging point, they each have an individual identity through some device with encoded information, symbol, mark, serial number, or component of the unit itself.

FIG. 2 shows that the items are placed either by hand or machine into a container, box, wrapping, binding, gig, form or some other device 203 which contains the units and makes them able to be handled as a single set or unit. The orientation of the items would depend upon the characteristics of how the identity of the manufactured units is to be contained on or in the item and how it would be read. For instance, bar code readers would require that the bar codes not be in shadow of the reading lasers and within the depth of field of the lenses. Similarly, machine cameras would require adequate lighting and that the identity symbols be "viewable" by the camera. Radio frequency devices would require that the container of the set could be moved through the range of the antenna device.

FIG. 2 shows the reading device 204 (any of the devices listed above) in useful proximity to the assembled grouping of manufactured items such that they are read en masse while contained as a set or grouping 203. More than one reading device might be required in order to effectively and efficiently read and process the identities of the manufactured item. For example, multiple reading devices may be used to simultaneously scann the individual units exposed on various sides of set 203.

Those reading devices 204 that are not programmable will require an interface 205 with a computer 206 or business system in order to complete the logic of the reading process. In either case, the identifiers, devices, marks, serial number, or data from a component of the unit itself would require processing to validate, format, and deliver the identities of the manufactured items to the business system 206 with the database in which set information is stored. Those data processes of validation, formatting, delivery to business system 206, and acknowledgment from business system 206, would vary depending upon the identity schema adopted within and the design of the manufacturing system and materials handling system.

As part of the processing mentioned in the previous paragraph, set validation, error condition tests, error condition handling, error logging, and event logging would be required. Manufactured items are in common practice packaged by sales order and the number of items required by the sales order may not be evenly divisible by the set size. This means that at the end of the order there will be a set with fewer members than the number required for a complete set. An incomplete or short set requires an evaluation either by human judgement or a computer system of whether the incomplete set is an error or not. In either case, the question to be answered is whether the number in the incomplete set completes the total number of manufactured items or sets required to fulfill the useful business grouping that the packing or packaging effort is intended to satisfy. For example and in other words: is the sales order, shipment, pallet, etc complete? Accordingly, if the short set is an error, steps must be taken by either an operator or the system to correct the error. Additionally, if the read of manufactured items identities is not the initial source of the identity information to the business system and the identity must be validated (as is usually the case) before it is associated with a set identity, error conditions could arise from a failure to validate identity.

In such a circumstance it would be necessary to ascertain the cause of the error. The error could be that the manufactured item could not be read correctly or that the manufactured item was read correctly but the data representing the unit ID could not be validated by the business system.

As an example of the flexibility that the present invention represents, a grouping for which an en masse read error occurs can be taken away from the read point and the work of packing or packaging continued.

Figure 3:
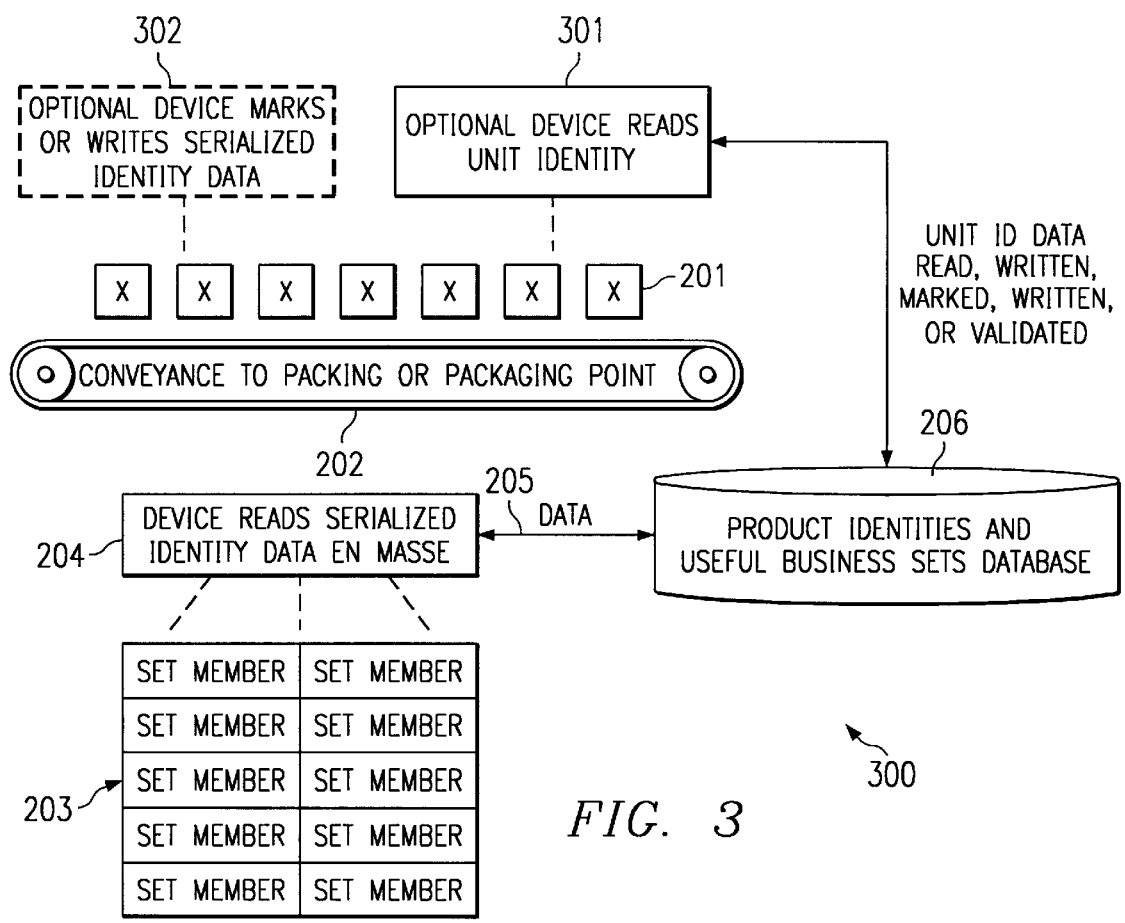
FIG. 3 is a high level, functional diagram of a method and system embodying the principles of the present invention in FIG. 2 that includes optional reading and writing devices that could occur in the method and system.

FIG. 3 shows a system 300 embodying the same principles of the present invention as FIG. 2. In addition, FIG. 3 shows how the invention could further include optional reading and writing devices if it is deemed advantageous to the business processes to which the present invention provides unit ID and group data, FIG. 3 shows an optional device 301 that reads unit identity data. This read is made prior to and functionally unconnected to the en masse read and could provide identity data where it might be needed for the processes of the business system. For instance, the read could provide data for labeling. In that case the unit ID would be read from the manufactured item and processed either internally to the reader(s) 301 or by a computer to which the reader(s) communicated, then forwarded in a useful format for insertion of identity data into the business system 206 or to a marking device. The usefulness of this is that labels could be applied to packaging into which the manufactured item is place and then the items packaged grouped together and read en masse.

FIG. 3 shows an optional device 302 that marks or writes serialized data. Such a device would be useful if was advantageous to mark or encode the unit ID on the manufactured item at a point at which it was being conveyed to the packing or packaging point. A reading device would also be useful at this point to validate the marked or encoded unit ID.

FIG. 3 illustrates that the present invention is useful as both a stand-alone method and system and in conjunction with other manufacturing and materials handing system and business process components.

Figure 4:
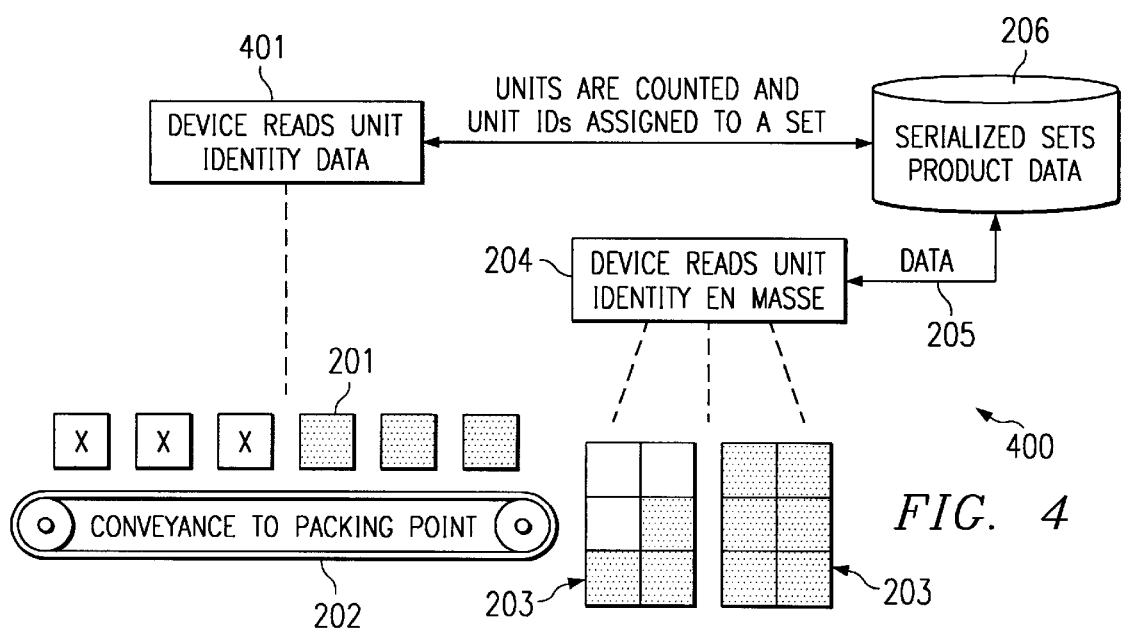
FIG. 4 is a high level, functional block diagram of a method and system embodying the principles of the present invention in FIG. 2 that shows optional reading and writing devices that could occur in the method and system and how the invented method and system might be used to assist a counting system by checking the accuracy of the sets created by it.

FIG. 4 shows an additional system 400 the same principles of the present invention as FIG. 2. In addition, FIG. 4 shows how the invention could be used to assist a counting system, including a reading device, by confirming the accuracy of the sets created by the counting system. Here, reading device 401 reads the identifier associated with each item 201 passing by on conveyor system 202. At the same time, the units are counted automatically in the usual manner. Then, an en masse read is performed by en masse reader 204 and the results used to confirm the accuracy of the counting process.

Notice a conventional counting-based system an arrangement lacks the flexibility inherent in the present invention and that in such a case it would be necessary to maintain the set integrity and for reliable error handling of the set sequence from the counting method to the confirmation of the set. In such a case, as the sets are read using the en masse read while contained, the set data collected by the reader(s) could then be compared to list of identifiable manufactured units contained in the database. If there was an error, that is, that the identities contained in the set did not match the list of what should be in the set, then entire packaging process would have to be brought to a halt and the error sorted out.

What is claimed is:

1. A method of preparing a set of tangible manufactured items for future business processes comprising the steps of:

grouping the items to be included in the set, each said item associated with a unique identifier;

reading and recording identifiers en masse to avoid routing of individual items;

communicating said recorded identifiers to a business system including a database; and generating a set identifier for said set of items with said business system from said recorded identifiers.

2. The method of claim 1 wherein said unique identifiers comprise serialized identifiers.

3. The method of claim 1 wherein said unique identifiers comprise marks.

4. The method of claim 1 wherein said unique identifiers comprise symbols.

5. The method of claim 1 wherein said unique identifiers comprise encoded devices that report said unique identifier.

6. The method of claim 1 wherein said unique identifiers comprise encoded devices associated with selected ones of said items that report said unique identifier.

7. The method of claim 1 and further comprising the steps of:

recording said set identifier;

generating a superset identifier from a plurality of like recorded set identifiers; and preparing a superset of said packaged items, said superset associated with said superset identifier.

8. The method of claim 1 and further comprising the step of generating said unique identifiers.

9. The method of claim 1 and further comprising the step of removing a selected unit from said set prior to said step of recording.

10. The method of claim 1 and further comprising the step of affixing said identifier to each said item prior said step of grouping.

11. The method of claim 1 wherein said step of recording comprises the substeps of:

electronically reading said identifier from each said item; and electronically recording said each said identifier read from each said item.

12. The method of claim 1 wherein each said identifier is electronically encoded into each said item.

13. A system for creating sets of tangible manufactured items, each said item associated with a unique identifier comprising:

means for assembling a plurality of said items into a set;

means for reading said unique identifiers associated with said items in said set en masse to avoid counting of individual items; and means for generating an identifier for said set from said unique identifiers read from said items in said set en masse.

14. The system of claim 13 wherein said means for assembling packs said plurality of items into said set.

15. The system of claim 13 wherein said means for assembling packages said plurality of items into said set.

16. The system of claim 13 wherein said unique identifiers comprise visible identifiers affixed to said items and said means for reading comprises an optical system for optically reading said visible identifiers.

17. The system of claim 13 wherein said unique identifiers comprise electronic identifiers associated with each of said items and said means for reading comprises an system for electronically detecting and decoding said electronic identifiers.

18. The system of claim 13 wherein said means for generating an identifier comprises:

a database for storing said unique identifiers read from said items in said set en masse; and a computing system coupled to said database for generating said set identifier from said unique identifiers stored in said database.

19. The system of claim 13 wherein said unique identifiers are serialized.

20. The system of claim 13 and further comprising second means for reading said unique identifiers prior to reaching said means for assembling.

21. The system of claim 20 and further comprising means for validating said unique identifiers read by said second means for reading using said unique identifiers read en masse.

22. The system of claim 13 wherein said unique identifiers are represented by a bar code associated with each said item.

23. The system of claim 13 wherein said unique identifiers comprise pictorial identifiers.

24. The system of claim 13 and further comprising:

means for assembling a plurality of like said sets into a superset;

means for reading said set identifiers associated with said sets en masse; and means for generating a unique identifier from said set identifiers read from said sets en masse.

25. The system of claim 13 wherein said means for assembling comprises an automated conveyor system.

* * * * *

UNITED STATES PATENT AND TRADEMARK OFFICE
CERTIFICATE OF CORRECTION

| | |
|---|---|
| PATENT NO. | : 6,697,812 B1 |
| APPLICATION NO. | : 09/484504 |
| DATED | : February 24, 2004 |
| INVENTOR(S) | : Peter Martin |

It is certified that error appears in the above-identified patent and that said Letters Patent is hereby corrected as shown below:

Column 7, lines 12-13, delete "routing" and replace with --counting--.

Signed and Sealed this
Nineteenth Day of June, 2012

David J. Kappos
*Director of the United States Patent and Trademark Office*